Jan. 28, 1936. R. JENNETT 2,028,784

HEDGE CUTTER

Filed Sept. 10, 1934

WITNESSES:
Jackson F. Mommann
Evelyn Baitzel

INVENTOR:
Robert Jennett
BY
Joshua R. H. Potts
ATTORNEY

Patented Jan. 28, 1936

2,028,784

UNITED STATES PATENT OFFICE 2,028,784

HEDGE CUTTER

Robert Jennett, Camden, N. J.

Application September 10, 1934, Serial No. 743,325

3 Claims. (Cl. 30—11.2)

This invention relates to hedge cutters and has for an object to provide improved means for clipping hedges or other vegetation which is to be trimmed to form, or in any other manner desired.

A further object of the invention is to provide a hedge cutter having a motor and a cutting unit of improved type associated with the motor.

A further object of the invention is to provide a hedge cutter embodying a motor with a unit attached to the motor, said unit including knives in any approved number which extend radially from said unit and are adapted to be adjusted relative to the unit and departing from their radial positions.

The invention, therefore, comprises a motor unit having means for conveniently manipulating the same with a disc attached to the arbor of the motor, said disc being provided with a plurality of knives extending from the perimeter thereof, said knives being adjustable relative to such perimeter upon a substantial radius of the unit or angled at either side of said radius, and with a shield positioned to protect the hand, which is operating the device, from contact with the knives.

The drawing illustrates an embodiment of the invention and the views therein are as follows.

Like characters of reference indicate corresponding parts throughout the several views.

Figures 1, 2:
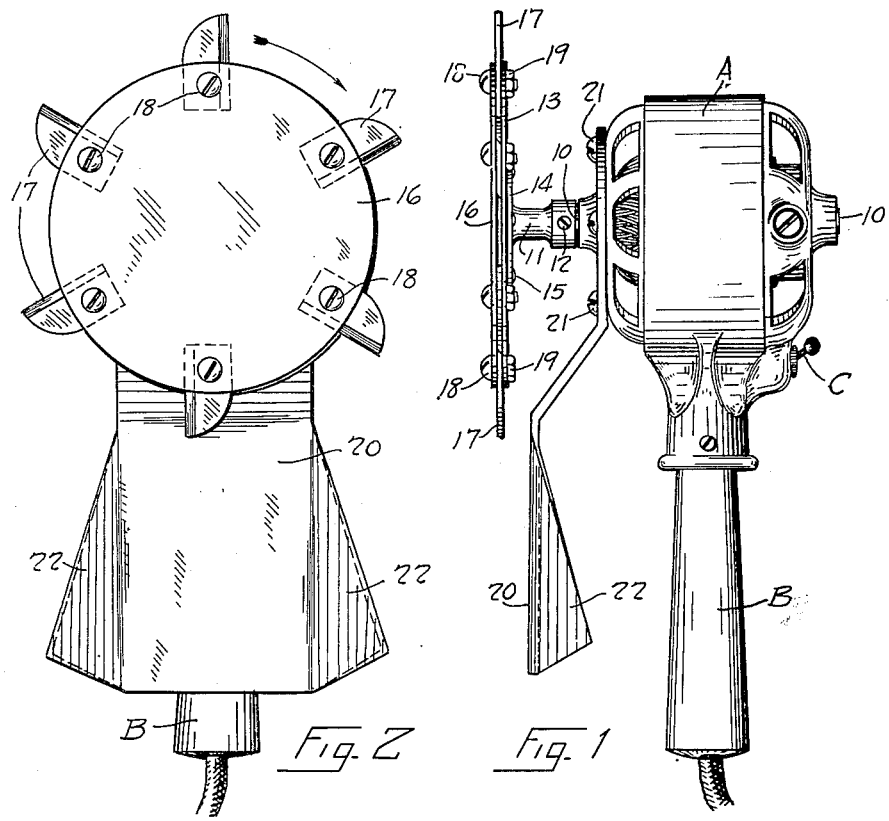
Figure 1 is a view of the hedge cutter in side elevation.
Figure 2 is a view of the hedge cutter in front elevation.

The invention comprises a motor A with handle B. Conveniently located upon the motor or handle is a switch C. These parts are the substantial equivalent of motors already known. The motor is provided with an arbor 10 and the present invention comprises means for attaching the cutting unit to the arbor. As shown, a sleeve 11 is applied upon the arbor and fixed as by the use of a set screw 12.

The sleeve 12 or its equivalent has attached thereto, a disc 13. The attachment may be in any approved manner or formed integral but is shown as having a circular flange 14 formed upon the sleeve 11 and secured by means of bolts or rivets 15.

A second disc 16 is employed in unity with the disc 13 and between the two discs 13 and 16 any desired number of knives 17 are inserted. These knives are clamped in working position by the use of any improved mechanical means as the bolts 18 which as shown have threaded engagement with nuts 19.

Attached to the device in any improved manner is a shield 20 so positioned as to protect the hand holding the handle B out of contact with the knives 17. As shown in the drawing this shield 20 is attached to the motor by means of bolts 21, but is to be understood that the invention comprehends the attachment of the shield by any improved mechanical manner. Preferably, the shield will be provided with wings 22 to more completely protect the hand.

Figures 3, 4:
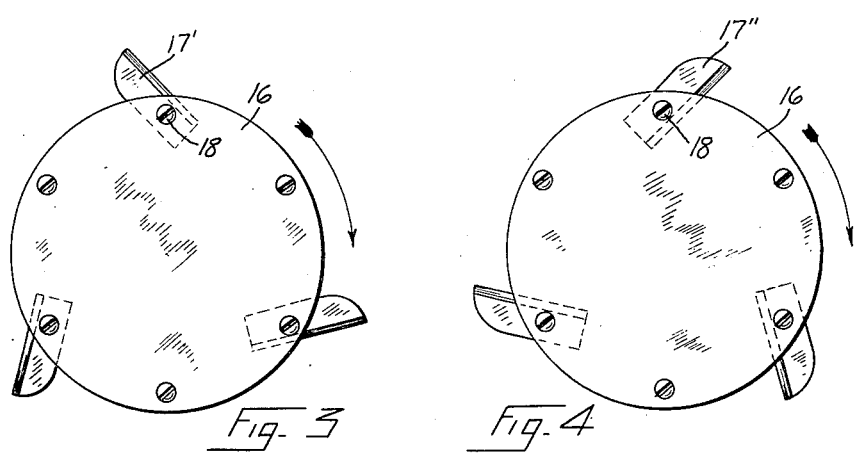
Figures 3 and 4 are respectively views in front elevation of the cutter unit showing the knives adjusted at elected angles.

As shown at Figure 2, the knives 17 are set substantially radially relative to the discs 13 and 16. At Figure 3 they are shown at 17' as having their cutting edges set obliquely to the perimeters of the disc, while at Figure 4 they are set to form an acute angle between the cutting edges and such perimeters. At Figure 2 there are six of the knives shown while at Figures 3 and 4, three knives are shown. It is obvious that the number of knives may be increased or decreased from the number shown without in any way departing from the invention.

With the knives arranged in either of the relations shown in the drawing, the switch C will be thrown to supply current to the motor whereupon the motor will drive the cutting unit with great rapidity. While so being driven, the cutter as an entirety will be grasped by the handle B and moved to such position as the occasion requires, clipping shoots or branches from a hedge. It may also be with equal efficiency employed for clipping the edges of grass plots or for cutting other vegetation when and where required and is not limited to the trimming of hedges, although that field would indicate its greatest utility and the device is so named accordingly.

Of course, the hedge cutter herein illustrated may be modified and changed in various ways without departing from the invention herein set forth and hereafter claimed.

I claim:—

1. The combination with a motor having an arbor, of a pair of discs carried centrally by the arbor, knives having one end inserted between the discs and the opposite end extending beyond the perimeters of the discs and angularly adjustable with relation thereto, means frictionally clamping the knives between the discs in such positions, and a shield positioned to protect the user from engagement with the knives.

2. The combination with a motor and motor casing having a handle and an arbor, the handle extending radially from the casing, of a pair of discs carried by the arbor, knives clamped between the discs and extending beyond the perimeters thereof, said knives being adjustable with respect to the discs to vary the angle of each of the knives with respect to the radius of the discs and a shield attached to the motor casing and extending rearwardly between the knives and the handle and provided with wings extending angularly from the lateral edges thereof, substantially as described.

3. A device of the character described comprising, in combination, a motor having an arbor, a pair of discs carried by the arbor, a plurality of knives carried between the discs with one end of each of the knives inserted between the discs and the opposite end extending beyond the peripheries of the discs, a pivotal mounting for each of the knives carried by the discs, and means associated with the pivotal mountings for frictionally clamping the knives between the discs in any adjusted position.

ROBERT JENNETT.